March 1, 1966     E. KOLLMANN ETAL     3,238,352
ELECTRODE HOLDER ARRANGEMENT FOR WELDING MACHINES
Filed March 25, 1963     2 Sheets-Sheet 1
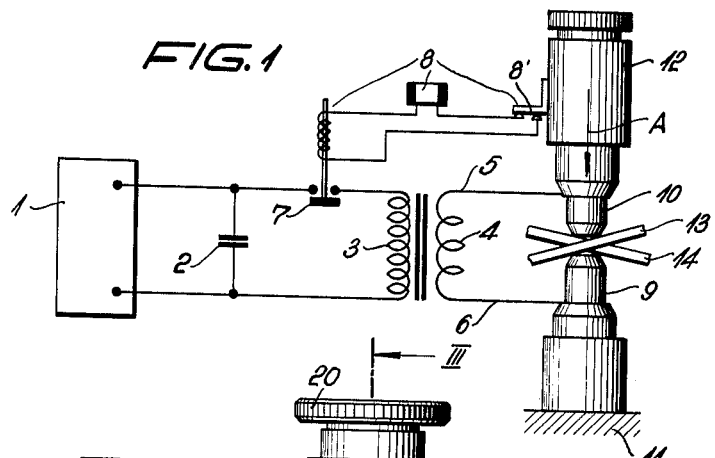
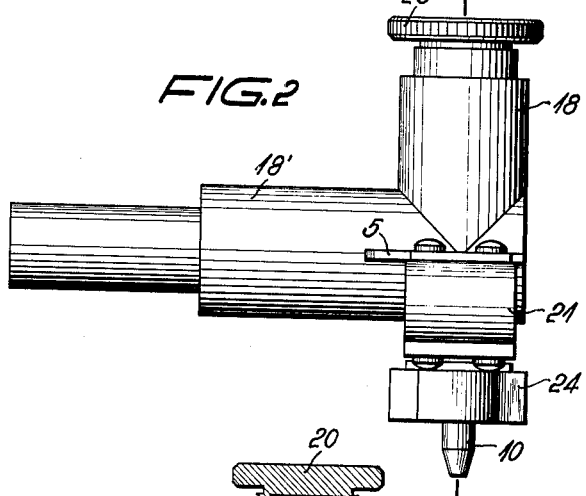
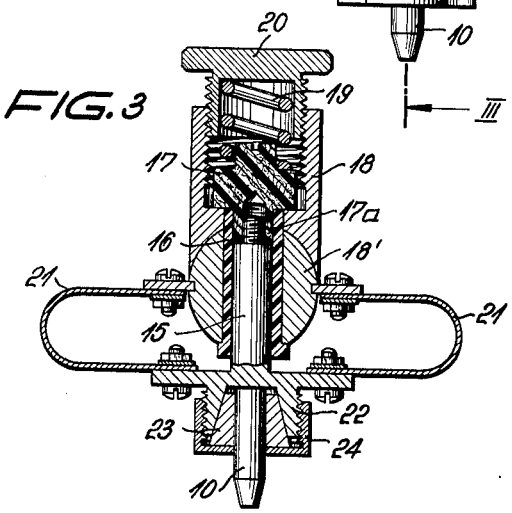
INVENTORS
Erich Kollmann
Heinrich Wagmann
Werner Westendorf
Heinz Alberti
by Michael S. Striker INVENTORS
Erich Kollmann
Heinrich Wagmann
Werner Westendorf
Heinz Alberti
by Michael S. Striker

United States Patent Office 3,238,352
Patented Mar. 1, 1966

3,238,352
ELECTRODE HOLDER ARRANGEMENT
FOR WELDING MACHINES
Erich Kollmann and Heinrich Wegmann, Hamburg-Rissen, Werner Westendorf, Hamburg-Gr. Flottbek, and Heinz Alberti, Hamburg-Rissen, Germany, assignors to Impulsphysik G.m.b.H., Hamburg-Rissen, Germany
Filed Mar. 25, 1963, Ser. No. 280,176
Claims priority, application Germany, Mar. 24, 1962, J 21,501
12 Claims. (Cl. 219—119)

The present invention concerns an electrode holder arrangement for electric welding machines, and particularly for welding machines adapted to carry out welding operations of extremely brief duration.

Welding machines of this class are, for instance, impulse welding machines operating on the basis of capacitor discharges and causing the welding material to soften very rapidly and abruptly. Similar conditions exist in so-called phase cutting machines supplied with or operated by alternating current at a frequency higher than 60 c.p.s. On the other hand, the same conditions are met also in the case of welding metals having a comparatively low melting point e.g. aluminum, in which case the problem to be solved exists also if the power supply to the welding electrodes is at a comparatively low frequency e.g. 60 c.p.s.

Many welding operations cannot be carried out except within a very brief period of time. To meet this condition conventional impulse welding machines are particularly well suited. In the operation of these machines the articles to be welded are placed between at least two electrodes. The welding electrodes are connected in circuit with the secondary winding of an impulse transformer, the primary winding of which is connected via a control device with a storage capacitor so that upon actuation of the control device the previously charged capacitor can be caused to discharge during a very brief period of time across the primary winding. The resulting impulse in the secondary circuit produces the welding current between the electrodes i.e. across the articles to be welded.

In order to produce a satisfactory and homogeneous weld it is necessary that during the actual welding operation while the welding material is still in a semi-solid or pasty state pressure is applied continuously to the articles to be welded. Of course, the amount of pressure depends upon the nature of the articles to be welded and upon the metal or metals they are made from. Thus the amount of pressure may vary from case to case.

In conventional welding machines usually one of the electrodes is mounted or supported stationarily while the counter electrode is held in a movable electrode holder whereby it can be pressed against the articles to be welded. The electrode holder arrangement is moved by a mechanical member of the welding machine and by means of a resilient member the required electrode pressure is derived from such movement. The movable electrode holder is usually guided in metal guide sleeves, and the resilient member usually consists of a steel spring of plate or coil form with adjustable degree of prestressing.

In welding operations of the type set forth and particularly in impulse welding machines it is of utmost importance that the movable electrode is enabled to follow the welding material which recedes due to softening or melting in the pressure area without any delay although the available time may amount to only a fraction of a millisecond so that during the welding operation there is never an instant when the articles to be welded are not under pressure.

Of course, one factor that has to be reduced to the utmost is the inertia of the moving parts of the electrode holder arrangement. For this purpose it is advisable to reduce the dimensions and the weight i.e. the mass of these moving parts as much as possible. However this must not be done indiscriminately but with consideration of the action of the resilient element. Actually the factor to be taken into consideration is the natural or resonant frequency of the moving parts which must be selected to correspond to the desired speed of the movement of the moving parts of the electrode holder arrangement. As is well known the natural frequency is determined by the equation $\omega^2=c/m$ wherein $c$ is the spring characteristic of the resilient element and $m$ is the mass of the moving part. Thus it can be seen that materials of different weight may be used for the moving parts provided that the spring characteristic of the resilient element is adjusted or chosen correspondingly.

By proceeding in the manner just described it is in many cases possible to provide for a natural frequency of the moving parts in such a way that the cycle of oscillation is comparatively short relative to the rising time of the electrical current pulse. However there are still many cases, particularly those concerned with the welding of metals which are hard to weld e.g. copper/copper or copper/silver, where the above described steps or measures are still not sufficient for producing entirely satisfactory welds. This is particularly disadvantageous if it is desired to use welding times of extremely brief duration which can be achieved by using firmly coupled welding transformers and low inductance connections, so-called tightly superimposed sandwich lines, between the transformer and the electrodes. Experiments have shown the highly desirable brief durations of the welding operations cannot be utilized and unsatisfactory welds are produced with such brief durations of the current impulse because the known electrode holder arrangements are incapable of causing the movable electrode holder parts to follow rapidly enough the dwindling dimensions of the melting articles to be welded.

It is therefore one object of this invention to provide for an electrode holder arrangement for electric welding machines for carrying out welding operations of extremely brief duration in which all delays of movement due to friction are practically eliminated.

It is another object of this invention to provide for an electrode holder arrangement of the type set forth which is comparatively simple in structure and entirely reliable in operation.

With the above objects in view the invention includes an electrode holder arrangement for electric welding machines for carrying out welding operations of extremely brief duration, comprising, in combination, housing means adapted to be attached to a portion of the welding machine; movable electrode holder means arranged for being shiftable relative to said housing means in a predetermined direction and in a direction opposite thereto; resilient biasing means interposed between a portion of said housing means and a potrion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes; and guide means for guiding substantially without friction said electrode holder means during the movements thereof relative to said housing means, said guide means being made of a material the static friction coefficient thereof relative to the adjacent material of said electrode holder means is substantially equal to its sliding friction coefficient, so that said electrode holder means are enabled to carry out said movement in opposite direction instantaneously as said counter-force diminishes.

It has been found that most suitable materials for the guide means and meeting the above conditions are fluorocarbon resins e.g. polytetrafluoroethylene. This material may be used as a guide sleeve for guiding a metal part of the electrode holder, or two guide members of this material may be arranged to slide one along the other, or finally a member of polyamide resin may be arranged to slide along a guide member of fluorocarbon resin. In all these cases the static friction coefficient of one of said materials relative to the other or that of the other member is substantially equal to its sliding friction coefficient.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic partial illustration of the electrode arrangement of an impulse welding machine together with the pertaining impulse producing circuit;

FIG. 2 is an elevation of an electrode holder arrangement according to the invention;

FIG. 3 is a sectional end view of the same arrangement, the section being taken along line III—III of FIG. 2;

Figure 4:
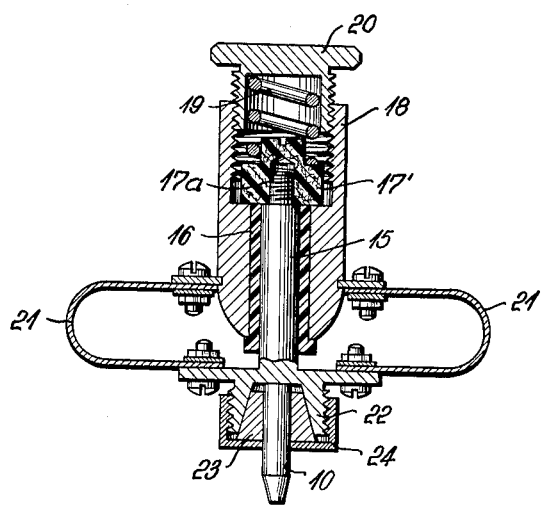
FIG. 4 is a sectional end view similar to FIG. 3 but showing a modification of the details thereof.

As can be seen from FIG. 1, in a conventional impulse welding machine a power supply 1 serves to charge a storage capacitor 2 which can be discharged from a predetermined charge potential across the primary winding 3 of the welding transformer as soon as the discharge circuit is closed by the switch device 7. The switch device may be of any suitable type, mechanical, a relay as shown or may be an electronic switch e.g. an ignitron. In the present example the switch device 7 is operated as a relay circuit 8 in which an energizing contact 8' is closed when the machine member 12 carrying the movable electrode holder 10 is moved downward into welding position. When the capacitor 2 is permitted to discharge through the primary 3 of the impulse transformer a current impulse of great strength is produced in the secondary 4 and applied to the electrodes 9 and 10 via low inductance connections 5 and 6. The articles to be welded 15 and 14 are located between the electrodes 9 and 10 of which electrode 9 is stationarily supported on the machine base 11 while the electrode 10 is arranged movably within the member or head 12 which is movable as a whole in the direction A and contains means for exerting resilient pressure on the electrode 10.

FIG. 2 and 3 illustrate one embodiment of an electrode holder arrangement according to the invention. It comprises a housing composed for a vertical portion 18 and a horizontal portion 18' firmly and permanently assembled with each other, the portion 18' serving to hold the entire arrangement in a movable member of the machine for being moved in vertical direction as mentioned in reference to FIG. 1. The vertical portion 18 has a cylindrical portion in which the guide stem 15 of the actual electrode holder 22 is slidably guided as will be described further below. The electrode 10 is held in the holder 22 by means of a chuck 23 and pressure cap 24. Two flexible flat conductors 21 connect the holder 22 conductively with the terminals to which the input connection 5 is attached.

The upper portion of the housing 18 is provided with a threaded recess which accommodates a helical spring 19 and a screw cap 20 the interior of which serves as abutment for one end of the spring 19. A pressure transfer member 17 is arranged between the other end of the spring 19 and the upper end of the stem 15. The member 17 bears along its lower circumference against a shoulder surrounding the cylindrical bore of the housing 18. The lower end of the member 17 projects into this bore and is attached to the stem 15 by a screw connection 17a.

In accordance with the invention the above mentioned cylindrical bore of the housing 18, 18' is lined with a guide sleeve 16 which surrounds the stem 15 with sliding fit. Similarly the projecting portion of the transfer member 17 is slidably guided within the upper portion of the guide sleeve 16. It is evident that the only areas where frictional engagement between moving and stationary parts is possible are the areas of engagement between the inner surface of the guide sleeve 16 and the corresponding outer surface portions of the above mentioned members movable within the guide sleeve 16. In accordance with the invention the guide sleeve 16 is made of polytetrafluoroethylene and the stem 15 may be made of any suitable metal like copper or aluminum. On the other hand, the transfer member 17 is is made of a suitable synthetic material reinforced by fibers, e.g. a polyamide resin.

It will be understood that by adjustment of the screw cap 20 the spring 19 can be pre-stressed as desired or required.

When the entire electrode holder arrangement is moved so as to cause the electrode 10 to engage the articles to be welded a certain initial contact pressure will be established as the stem 15 is forced a certain distance upward into the housing 18 whereby the spring 19 is somewhat compressed in addition to its being pre-stressed. If now in this position of the electrode holder arrangement the current impulse is applied to the electrode circuit so as to rapidly heat and soften the material of the articles to be welded the resulting reduction of the distance between the electrodes 9 and 10 will cause the stem 15 and the transfer member 17 to move in opposite direction under the action of the spring 19. In view of the fact that the coefficient of friction between the stationary guide sleeve 16 and the above mentioned parts moving therein is extremely low, and in addition in view of the static friction between these parts being substantially equal to the sliding friction any undesirable delay in the movement of the electrode 10 following the receding softened material is avoided.

FIG. 4 illustrates a modification of the arrangement according to FIG. 3. All those elements which are identical with those of FIG. 3 are designated by the same reference numerals. Thus it can be seen that the only difference between FIGS. 3 and 4 is that the transfer member 17' is not provided with a projection sliding within the guide sleeve 16 so that any friction between the latter and a portion of the transfer member 17' is avoided. Consequently the material for the transfer member 17' can be chosen only in view of its strength and insulating characteristic but irrespective of questions of friction. The insulating characteristic of the member 17 or 17' as well as of the sleeve 16 must not be disregarded because the current from the impluse transformer to the electrode 10 must flow exclusively through the flexible conductors 21 and must not pass through the guide stem 15 because otherwise the latter may be caused to expand due to rise of temperature whereby its sliding fit within the guide sleeve 16 would be affected.

Figure 5:
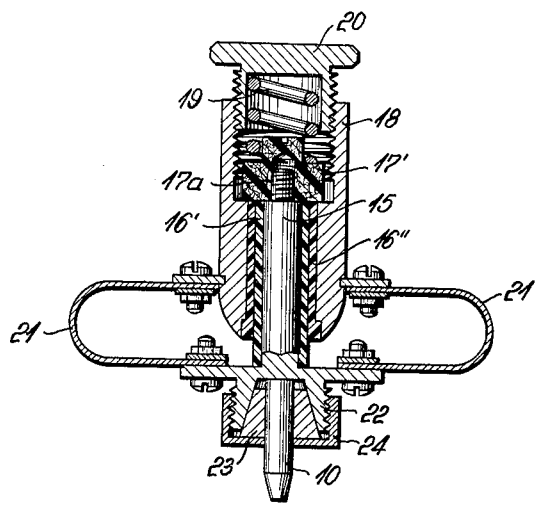
FIG. 5 is another sectional end view similar to FIGS. 3 and 4 showing a further modification of the details thereof.

FIG. 5 illustrates still another modification of the above embodiments. Again all those elements which are unchanged are designated by the same reference numerals. In order to still further improve the movability of the electrode holder 15, 22 relative to the housing 18 this embodiment comprises not only a guide sleeve 16' stationarily mounted in the cylindrical bore of the housing 18 but also an additional guide sleeve 16" mounted on the outside of the stem 15. Consequently now two guide sleeves 16' and 16" of similar material having an extremely low coefficient of friction, e.g., of tetrafluoroethylene are arranged to slide one within the other. Again in this manner the object of the invention is most satisfactorily accomplished. A further advantage of the arrangement according to FIG. 5 is the outside of the stem 15 does not require as precise a machining and polishing as in the previously described cases where the surface of the stem 15 slides directly along the inner surface of the guide sleeve 16.

Experiments have proven to full satisfaction that with an electrode holder arrangement according to the invention the extremely brief current impulse durations of a high quality impulse welding machine can be utilized to fullest advantage for welding satisfactorily articles made of materials which could not be welded satisfactorily up to now because of their very rapid softening under the action of the welding current, e.g., when copper strands had to be welded to aluminum or to certain types of brass.

It will be understood that each of the elements described above, or two or more together, may also find a useful application in other types of electrode holder arrangements differing from the types described above.

While the invention has been illustrated and described as embodied in electrode holder arrangements for electric welding machines for carrying out welding operations of extremely brief duration, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefor, such adaptations should and are intended to be comprehended within the meaning and range of equivalence of the following claims.

What is claimed as new and desired to be secured by Letters Patent is:

1. An electrode holder arrangement for electric welding means adapted to be attached to a portion of the tremely brief duration, comprising, in combination, housing means adapted to be attached to a portion of the welding machine; movable electrode holder means arranged for being shiftable relative to said housing means in a predetermined direction and in a direction opposite thereto; resilient biasing means interposed between a portion of said housing means and a portion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes, said electrode holder means and said biasing means together having a natural frequency so selected as to enable the electrode holder means to follow the receding of the welding material due to softening without delay; and guide means for guiding substantially without friction said electrode holder means during the movements thereof relative to said housing means, said guide means being made of a material the static friction coefficient whereof relative to the adjacent material of said electrode holder means is substantially equal to its sliding friction coefficient, both said friction coefficients of said material of said guide means being very small and not exceeding the range of the corresponding friction coefficients of fluorocarbon resins, so that said electrode holder means is able to carry out said movement in opposite direction instantaneously as said counter-force diminishes.

2. An electrode holder arrangement for electric welding machines for carrying out welding operations of extremely brief duration, comprising, in combination, housing means adapted to be attached to a portion of the welding machine; movable electrode holder means arranged for being shiftable relative to said housing means in a predetermined direction and in a direction opposite thereto; resilient biasing means interposed between a portion of said housing means and a portion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes, said electrode holder means and said biasing means together having a natural frequency so selected as to enable the electrode holder means to follow the receding of the welding material due to softening without delay; and guide means for guiding substantially without friction said electrode holder means during the movements thereof relative to said housing means, said guide means being made of a fluorocarbon resin the static friction coefficient whereof relative to the adjacent material of said electrode holder means is substantially equal to its sliding friction coefficient, so that said electrode holder means are enabled to carry out said movement in opposite direction instantaneously as said counter-force diminishes.

3. An electrode holder arrangement for electric welding machines for carrying out welding operations of extremely brief duration, comprising, in combination, housing means adapted to be attached to a potrion of the welding machine; movable electrode holder means arranged for being shiftable relative to said housing means in a predetermined direction and in a direction opposite thereto; resilient biasing means interposed between a portion of said housing means and a portion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes, said electrode holder means and said biasing means together having a natural frequency so selected as to enable the electrode holder means to follow the receding of the welding material due to softening without delay; and guide means for guiding substantially without friction said electrode holder means during the movements thereof relative to said housing means, said guide means being made of polytetrafluoroethylene the static friction coefficient whereof relative to the adjacent material of said electrode holder means is substantially equal to its sliding frction coefficient, so that said electrode holder means are enabled to carry out said movement in opposite direction instantaneously as said counter-force diminishes.

4. An electrode holder arrangement for electric welding machines for carrying out welding operations of extremely brief duration, comprising, in combination, housing means adapted to be attached to a portion of the welding machine and having a tubular portion; movable electrode holder means arranged for being shiftable relative to said housing means in a predetermined direction and in a direction opposite thereto and having a guide stem portion extending into said tubular portion of said housing means; resilient biasing means interposed between a portion of said housing means and said guide stem portion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes, said electrode holder means and said biasing means together having a natural frequency so selected as to enable the electrode holder means to follow the receding of the welding material due to softening without delay; and guide means including sleeve means arranged along the inside of said tubular housing portion and surrounding said stem portion for guiding substantially without friction said electrode holder means during the movements thereof relative to said housing means, said sleeve means being made of a fluorocarbon resin the static friction coefficient whereof relative to the adjacent material of said electrode holder means is substantially equal to its sliding friction coefficient, so that said electrode holder means are enabled to carry out said movement in opposite direction instantaneously as said counter-force diminishes.

5. An electrode holder arrangement for electric welding machines for carrying out welding operations of extremely brief duration, comprising, in combination, housing means adapted to be attached to a portion of the welding machine and having a tubular portion; movable electrode holder means arranged for being shiftable relative to said housing means in a predetermine direction and in a direction opposite thereto and having a guide stem portion extending into said tubular portion of said housing means; resilient biasing means interposed between a portion of said housing means and said guide stem portion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes, said electrode holder means and said biasing means together having a natural frequency so selected as to enable the electrode holder means to follow the receding of the welding material due to softening without delay; and guide means including sleeve means comprising a first sleeve member arranged along the inside of said tubular housing portion and a second sleeve member surrounding said stem portion and being along its outer surface in sliding contact with the inside of said first sleeve member, for guiding substantially without friction said electrode holder means during the movements thereof relative to said housing means, said sleeve members being made of a material the static friction coefficient whereof relative to the same material in the adjacent sleeve member is substantially equal to its sliding friction coefficient, and said first and second sleeve members being made of a fluorocarbon resin, so that said electrode holder means are enabled to carry out said movement in opposite direction instantaneously as said counter-force diminishes.

6. An electrode holder arrangement for electric welding machines for carrying out welding operations of extremely brief duration, comprising, in combination, housing means adapted to be attached to a portion of the welding machine and having a tubular portion; movable electrode holder means arranged for being shiftable relative to said housing means in a predetermined direction and in a direction opposite thereto and having a guide stem portion extending into said tubular portion of said housing means; resilient biasing means interposed between a portion of said housing means and said guide stem portion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes, said electrode holder means and said biasing means together having a natural frequency so selected as to enable the electrode holder means to follow the receding of the welding material due to softening without delay; and guide means including sleeve means comprising a first sleeve member arranged along the inside of said tubular housing portion and a second sleeve member surrounding said stem portion and being along its outer surface in sliding contact with the inside of said first sleeve member, for guiding substantially without friction said electrode holder means during the movements thereof relative to said housing means, said sleeve members being made respectively of a material the static friction coefficient whereof relative to the material in the adjacent sleeve member is substantially equal to its sliding friction coefficient, one of said first and second sleeve members being made of a fluorocarbon resin, the other one being made of a polyamide resin, so that said electrode holder means are enabled to carry out said movement in opposite direction instantaneously as said counter-force diminishes.

7. An electrode holder arrangement for electric welding machines for carrying out welding operations of extremely brief duration, comprising, in combination, housing means adapted to be attached to a portion of the welding machine and having a tubular portion; movable electrode holder means arranged for being shiftable relative to said housing means in a predetermined direction and in a direction opposite thereof and having a guide stem portion extending into said tubular portion of said housing means; resilient biasing means interposed between a portion of said housing means and said guide stem portion of said electrode holder means for permitting movement of the latter from a predetermined normal position thereof in said one predetermined direction in response to a counter-force acting on said electrode holder means and overcoming the action of said resilient biasing means, and for returning said electrode holder means in said opposite direction toward said normal position thereof when thereafter said force diminishes, said electrode holder means and said biasing means together having a natural frequency so selected as to enable the electrode holder means to follow the receding of the welding material due to softening without delay, said resilient biasing means including a pressure transfer member having a portion projecting into said tubular housing portion and abutting against one end of said stem portion, and a resilient member arranged in a state of predetermined tension between said pressure transfer member and a portion of said housing means, at least said portion of said pressure transfer member being made of a polyamide resin; and guide means including sleeve means arranged along the inside of said tubular housing portion and surrounding said stem portion and said projecting portion of said pressure transfer member, for guiding substantially without friction said electrode holder means and said pressure transfer member during the movements thereof relative to said housing means, said sleeve means being made of a fluorocarbon resin the static friction coefficient whereof relative to the adjacent material of said electrode holder means and of said projecting portion of said pressure transfer member is substantially equal to its sliding friction coefficient, so that said electrode holder means are enabled to carry out said movement in opposite direction instantaneously as said counter-force diminishes.

8. An arrangement according to claim 1, wherein said movable electrode holder means are made of lightweight material so as to predetermine a low inertia of said electrode holder means whereby instantaneous movement thereof when said counter-force diminishes is facilitated.

9. An electrode holder arrangement for electric welding machines carrying out welding operations requiring substantially instantaneous follow-up of the electrode in response to softening of the material to be welded, comprising, in combination, support means; a stationary electrode fixedly mounted on said support means; a housing arranged opposite said stationary electrode, spaced therefrom and axially aligned therewith; electrode means in said housing and being movable toward and away from said stationary electrode; biasing means for biasing said electrode means toward said stationary electrode; guide means in said housing for guiding said electrode means during movement thereof, said guide means being made of a material the static friction coefficient whereof relative to the adjacent material of said electrode means is substantially equal to its sliding friction coefficient, both said friction coefficients of said material of said guide means being very small and not exceeding the range of the corresponding friction coefficients of fluorocarbon resins, and the unit formed by said electrode means and said biasing means having a natural frequency so selected, that said electrode means may respond to the urging of said biasing means substantially simultaneously and may follow without time delay any softening of the workpieces to be welded and placed between said stationary electrode and said electrode means, so that said biasing means, acting on said electrode means, will continuously press said workpieces together.

10. An electrode holder arrangement for electric welding machines as defined in claim 9, wherein the value of both the static friction coefficient and the sliding friction coefficient of said guide means is 0.04.

11. An electrode holder arrangement for electric welding machines as defined in claim 9, wherein said guide means consists of a fluorocarbon resin.

12. An electrode holder arrangement for electric welding machines as defined in claim 11, wherein said fluorocarbon resin is polytetrafluoroethylene.

References Cited by the Examiner

UNITED STATES PATENTS

| | | | |
|---|---|---|---|
| 1,434,374 | 11/1922 | Lemon et al. | 219—86 |
| 1,536,838 | 5/1925 | Geisenhouer | 219—86 |

RICHARD M. WOOD, *Primary Examiner.*